US012801118B2

(12) United States Patent
Wright et al.

(10) Patent No.: US 12,801,118 B2
(45) Date of Patent: Nov. 17, 2026

(54) POWDER DEGRADATION PREDICTIONS

(71) Applicant: Peridot Print LLC, Palo Alto, CA (US)

(72) Inventors: Jacob Tyler Wright, San Diego, CA (US); Sunil Kothari, Palo Alto, CA (US); Juan Carlos Catana Salazar, Guadalajara (MX); Lei Chen, Shanghai (CN); Maria Fabiola Leyva Mendivil, Guadalajara (MX); Jun Zeng, Palo Alto, CA (US)

(73) Assignee: Peridot Print LLC, Palo Alto, CA (US)

( * ) Notice: Subject to any disclaimer, the term of this patent is extended or adjusted under 35 U.S.C. 154(b) by 222 days.

(21) Appl. No.: 18/719,204

(22) PCT Filed: Dec. 13, 2021

(86) PCT No.: PCT/US2021/063105
§ 371 (c)(1),
(2) Date: Jun. 12, 2024

(87) PCT Pub. No.: WO2023/113770
PCT Pub. Date: Jun. 22, 2023

(65) Prior Publication Data
US 2025/0053152 A1 Feb. 13, 2025

(51) Int. Cl.
*G05B 19/4099* (2006.01)

(52) U.S. Cl.
CPC .................... *G05B 19/4099* (2013.01); *G05B 2219/49023* (2013.01)

(58) Field of Classification Search
CPC ... G06T 7/0012; B29C 64/386; B29C 64/153; B29C 64/277; A61B 5/055;
(Continued)

(56) References Cited

U.S. PATENT DOCUMENTS

| | | | | |
|---|---|---|---|---|
| 9,679,244 | B2 | 6/2017 | Ohno et al. | |
| 2016/0337549 | A1* | 11/2016 | Nuuja | G06F 3/1222 |

(Continued)

FOREIGN PATENT DOCUMENTS

| | | | |
|---|---|---|---|
| CN | 106127726 | A * | 11/2016 |
| CN | 116940458 | A | 10/2023 |

(Continued)

OTHER PUBLICATIONS

Gobert, C., Reutzel, E.W., Petrich, J., Nassar, A.R. and Phoha, S., 2018. Application of supervised machine learning for defect detection during metallic powder bed fusion additive manufacturing using high resolution imaging. Additive Manufacturing, 21, pp. 517-528. (Year: 2018).*

(Continued)

*Primary Examiner* — Alicia M. Choi
(74) *Attorney, Agent, or Firm* — Law Offices of Michael Dryja; Michael Dryja

(57) ABSTRACT

Examples of methods are described. In some examples, a method includes determining a quantification of a spatial neighborhood of a voxel of a build volume. In some examples, the method includes predicting, using a machine learning model, a manufacturing powder degradation based on the quantification and a position of the voxel.

20 Claims, 6 Drawing Sheets

(58) Field of Classification Search

CPC ...... G05B 19/4099; G05B 2219/49023; G06F 30/27; G06F 2113/10; B22F 10/73; B22F 2999/00; B22F 10/34; B22F 10/80; B33Y 50/00; B33Y 10/00; G06N 3/044; G06N 3/0464; G06N 3/09; Y02P 10/25

See application file for complete search history.

(56) References Cited

U.S. PATENT DOCUMENTS

| | | | |
|---|---|---|---|
| 2017/0355143 A1 | 12/2017 | Speckmann et al. | |
| 2019/0210108 A1 | 7/2019 | Weaver et al. | |
| 2020/0089826 A1 | 3/2020 | Liu et al. | |
| 2021/0268740 A1 | 9/2021 | Coco et al. | |
| 2021/0286015 A1* | 9/2021 | Carlsson | G06F 30/27 |
| 2024/0123689 A1 | 4/2024 | Wright et al. | |
| 2024/0168457 A1 | 5/2024 | Wright et al. | |

FOREIGN PATENT DOCUMENTS

| | | | | |
|---|---|---|---|---|
| CN | 117083162 A | 11/2023 | | |
| EP | 3872481 A1 | 9/2021 | | |
| EP | 4274730 A4 | 9/2024 | | |
| EP | 4288272 A4 | 10/2024 | | |
| GB | 2568694 A * | 5/2019 | | B29C 64/153 |
| WO | 2019/097222 A1 | 5/2019 | | |
| WO | 2020/226605 A1 | 11/2020 | | |
| WO | 2022/191822 A1 | 9/2022 | | |
| WO | 2022/203679 A1 | 9/2022 | | |

OTHER PUBLICATIONS

Park, S.I. and Rosen, D.W., 2016. Quantifying effects of material extrusion additive manufacturing process on mechanical properties of lattice structures using as-fabricated voxel modeling. Additive Manufacturing, 12, pp. 265-273. (Year: 2016).*

Josupeit, S., et al., “Modelling of temperatures and heat flow within laser sintered part cakes.”, Additive Manufacturing, vol. 12, Jun. 2, 2016, pp. 189-196.

* cited by examiner

POWDER DEGRADATION PREDICTIONS

BACKGROUND

Additive manufacturing is a technique to form three-dimensional (3D) objects by adding material until the object is formed. The material may be added by forming several layers of material with each layer stacked on top of the previous layer. Examples of additive manufacturing include melting a filament to form each layer of the 3D object (e.g., fused filament fabrication), curing a resin to form each layer of the 3D object (e.g., stereolithography), sintering, melting, or binding powder to form each layer of the 3D object (e.g., selective laser sintering or melting, multi jet fusion, metal jet fusion, etc.), and binding sheets of material to form the 3D object (e.g., laminated object manufacturing, etc.).

DETAILED DESCRIPTION

Figure 1:
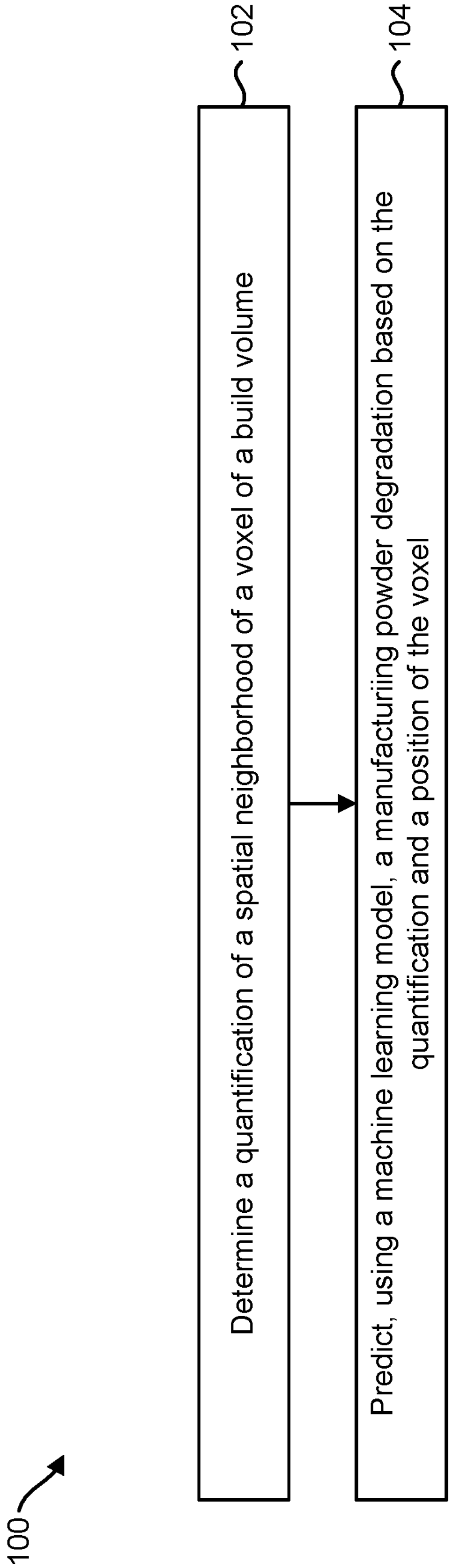
FIG. 1 is a flow diagram illustrating an example of a method for powder degradation predictions.

Additive manufacturing may be used to manufacture three-dimensional (3D) objects. 3D printing is an example of additive manufacturing. Manufacturing powder (and/or "powder" herein) is particles of material for manufacturing an object or objects. For instance, polymer particles are an example of manufacturing powder. In some examples, an object may indicate or correspond to a region (e.g., area, volume, etc.) where particles are to be sintered, melted, or solidified. For example, an object may be formed from sintered or melted powder. In many types of 3D printing, layers of manufacturing powder are delivered to a build volume. After each layer is delivered, heat may be applied to portions of the layer to cause the powder to coalesce (e.g., sinter) in those portions and/or to remove solvents from a fusing agent or binding agent. For example, a fusing agent or a binding agent may be applied to some portions for coalescence or binding, and/or a detailing agent may be applied to some portions to avoid coalescence. An energy source may deliver energy that is absorbed by the fusing agent or binding agent to cause the powder to coalesce. Additional layers are delivered and selectively heated to build up a 3D object from the coalesced powder. After the layers have been delivered and heated, the build volume may be allowed to cool for a period of time. The 3D objects are then removed from a build volume (e.g., powder bed). The remaining powder can be recycled or discarded. Recycling the powder reduces waste and reduces the cost of printing each object.

A voxel is a representation of a location in a 3D space. For example, a voxel may represent a volume or component of a 3D space. For instance, a voxel may represent a volume that is a subset of the 3D space. In some examples, voxels may be arranged on a 3D grid. For instance, a voxel may be rectangular or cubic in shape. Examples of a voxel size dimension may include 25.4 millimeters (mm)/150≈170 microns for 150 dots per inch (dpi), 490 microns for 50 dpi, 0.5 mm, 1 mm, 2 mm, 4 mm, 5 mm, etc. A set of voxels may be utilized to represent a build volume. The term "voxel level" and variations thereof may refer to a resolution, scale, and/or density corresponding to voxel size.

A build volume is a volume in which an object or objects may be manufactured. For instance, a build volume may be a representation of a physical volume and/or may be an actual physical volume (e.g., a print chamber, build chamber, and/or powder bed) in which an object or objects may be manufactured. A "build" may refer to an instance of 3D manufacturing. For example, a build may geometrically represent an object region(s) and/or a non-object region(s) (e.g., unfused powder region(s)). A build may be included in and/or may occupy a build volume for manufacturing. A layer is a portion of a build volume. For example, a layer may be a cross section (e.g., two-dimensional (2D) cross section or a 3D portion) of a build volume. In some examples, a layer may be a slice with a thickness (e.g., 80-micron thickness or another thickness) of a build volume. In some examples, a layer may refer to a horizontal portion (e.g., plane) of a build volume. In some examples, an "object" may refer to an area and/or volume in a layer and/or build volume indicated for forming an object.

Manufacturing powder may degrade and oxidize when exposed to elevated temperatures. For example, polymer powders, such as polyamide 12 (PA 12), may degrade during 3D printing due to the exposure to air, humidity, and/or elevated temperatures. For instance, oxidation may occur due to environmental exposure (e.g., contact with air and/or humidity). In some examples, the powder may spend 30 to 40 hours above 160° C. during the printing and cooling process, which may cause powder degradation. Repeated printing may cause the powder to become degraded enough to affect the 3D printing process. For example, degraded powder may cause surface distortions, such as an orange peel effect, poor mechanical properties, off-gassing that creates porosity in the object, and the like. In some examples of manufacturing powder (e.g., PA 12), degradation may become evident with yellowing of the manufacturing powder. In some examples of manufacturing powder (e.g., PA 11), degradation may occur while being less visibly evident or without being visibly evident.

Various remediation techniques may be used to limit the degradation. For example, antioxidant packages may be included inside the powder, but the degradation may still occur. For instance, anti-oxidation additives and flowability additives may break down at high temperatures, which may contribute to powder yellowing. Some agents may worsen powder yellowing, which may imply that degradation is affected by a combination of gases in the powder. Using a nitrogen environment during 3D printing can reduce oxidation. However, gases (e.g., oxygen) can be dissolved in the powder or can enter the powder. Accordingly, the remediation techniques may have limited effectiveness. Moreover, the remediation techniques may increase the printing cost.

In some examples, polymers may degrade due to temperature and oxygen reactions. Temperature increases molecular mobility, allowing polymer chains to increase in length (post-condensation), cross-link with other chains and, with further degradation, strip or even split the chain (e.g., chain stripping, chain scission, respectively). Gases (e.g., oxygen) may react with the polymer molecules causing post-condensation at early stages of degradation, branching of the polymer chains, and, as the reaction continues, scission of the polymer chains.

In some examples, unfused powder may be heated due to the energy applied to fuse the object layers. A source of gases may be an ambient temperature and oxygen-containing agents. How temperature and gases diffuse throughout the powder may be linked to the geometry of packed objects (e.g., the object itself and other objects around the object) and the location of the powder within the print chamber. In some cases, it may be difficult to isolate the effects of temperature, gas diffusion, geometry, and/or location or make a quantitative measurement for each degradation cause.

The degradation can also be remediated by mixing fresh powder with recycled powder. As used herein, the term "fresh powder" refers to powder that has not been used for 3D printing, and the term "recycled powder" refers to powder that has been through the 3D printing process. A quality metric may be used to measure and/or indicate the amount of degradation of the powder. For example, the quality metric may be the relative solution viscosity, the molecular weight, or the like, which may correlate with the amount of degradation. In some examples, the quality metric may be a measurement of color. For instance, the amount of degradation of PA 12 is highly correlated with the color of the powder. For example, the amount of degradation is highly correlated with the b* component of the Commission on Illumination L*a*b* (CIELAB) color space. In some examples, degradation and/or powder quality may be measured and/or represented with b*. For instance, the quality metric may be associated with powder color (e.g., yellowness index (YI), American Society for Testing and Materials (ASTM) E313). In some examples, fresh powder may be added to recycled powder to keep a quality metric above a threshold. For example, a user may target to use powder with a b* of less than 4.

It can be difficult to discern a degree to which powder will degrade during a particular print. The degradation is affected by the ability of gases to diffuse into the surrounding environment, which in turn depends on the arrangement of objects, and by the amount of agent (e.g., a detailing agent, a color agent, or the like) delivered to the powder. Some examples of the techniques described herein may quantify the effect of gas (e.g., oxygen) diffusion through powder and/or object.

Some approaches to determine powder degradation may be based on thermal behavior simulation. In some examples, simulation may operate relatively slowly. For instance, some simulation approaches may simulate incremental thermal behavior of each voxel in the print bed over a period. Some simulation approaches may take on the order of 20 minutes to simulate the thermal behavior in the build volume. For example, simulating the thermal behavior may include calculating a thermal profile of approximately one million voxels and calculating cumulative powder degradation for each of those profiles, yielding a total computation rate of approximately 800 voxels/second.

Some examples of the techniques described herein may utilize a machine learning model or models. Machine learning is a technique where a machine learning model is trained to perform a task or tasks based on a set of examples (e.g., data). Training a machine learning model may include determining weights corresponding to structures of the machine learning model. Artificial neural networks are a kind of machine learning model that are structured with nodes, model layers, and/or connections. Deep learning is a kind of machine learning that utilizes multiple layers. A deep neural network is a neural network that utilizes deep learning.

Examples of neural networks include convolutional neural networks (CNNs) (e.g., basic CNN, deconvolutional neural network, inception module, residual neural network, fully connected neural network (FCNN), etc.), recurrent neural networks (RNNs) (e.g., basic RNN, multi-layer RNN, bi-directional RNN, fused RNN, clockwork RNN, etc.), graph neural networks (GNNs), etc. Different depths of a neural network or neural networks may be utilized in accordance with some examples of the techniques described herein.

Some examples of the techniques described herein may utilize a machine learning model (e.g., FCNN) to determine (e.g., predict, infer, etc.) manufacturing powder degradation of a build from voxel data. Some examples of the techniques described herein may allow accurately determining manufacturing powder degradation in a relatively short time period (e.g., in milliseconds). For instance, some examples of the techniques may provide rapid feedback on the degradation of a build volume (e.g., powder refresh ratio).

While plastics (e.g., polymers) may be utilized as a way to illustrate some of the approaches described herein, some the techniques described herein may be utilized in various examples of additive manufacturing. For instance, some examples may be utilized for plastics, polymers, semi-crystalline materials, metals, etc. Some additive manufacturing techniques may be powder-based and driven by powder fusion (e.g., area-based powder bed fusion-based additive manufacturing). Some examples of the approaches described herein may be applied to additive manufacturing techniques such as stereolithography (SLA), multi jet fusion (MJF), metal jet fusion, selective laser melting (SLM), selective laser sintering (SLS), liquid resin-based printing, etc. Some examples of the approaches described herein may be applied to additive manufacturing where agents carried by droplets are utilized for voxel-level thermal modulation.

Throughout the drawings, similar reference numbers may designate similar or identical elements. When an element is referred to without a reference number, this may refer to the element generally, without limitation to any particular drawing or figure. In some examples, the drawings are not to scale and/or the size of some parts may be exaggerated to more clearly illustrate the example shown. Moreover, the drawings provide examples in accordance with the description. However, the description is not limited to the examples provided in the drawings.

FIG. 1 is a flow diagram illustrating an example of a method 100 for powder degradation predictions. For example, the method 100 may be performed to determine a manufacturing powder degradation from a build. The method 100 and/or an element or elements of the method 100 may be performed by an electronic device. For example, the method 100 may be performed by the apparatus 324 described in relation to FIG. 3.

The apparatus may determine 102 a quantification of a spatial neighborhood of a voxel of a build volume. A spatial neighborhood of a voxel is a region around (e.g., surrounding) a voxel. For instance, a spatial neighborhood of a voxel may be a region within a distance from the voxel (e.g., from a center of the voxel). In some examples, a spatial neighborhood of a voxel may be a region within a distance from the voxel (e.g., 1 millimeter (mm), 2 mm, 5 mm, 1 centimeter (cm), 1 inch, 2 inches, 4 inches, 5 inches, 9 inches, etc.) in two dimensions and/or in three dimensions. In some examples, a spatial neighborhood may be set in terms of a distance and/or a number of voxels from a voxel (e.g., central voxel). For instance, a spatial neighborhood may be a spherical region centered at a voxel.

A quantification is a quantity (e.g., value, number, amount) that indicates a characteristic. For instance, a quantification of a spatial neighborhood of a voxel may be a quantity indicating a characteristic of the spatial neighborhood of the voxel. In some examples, the quantification of the spatial neighborhood may be a quantity indicating a convolution of the spatial neighborhood. In some examples, determining the quantification may include performing a convolution on the spatial neighborhood of the voxel. For instance, the apparatus may convolve the spatial neighborhood of the voxel with a function (e.g., gaussian function, exponential function, logarithmic function, polynomial function, etc.) to produce the quantification. In some examples, the convolution may be a gaussian convolution. For instance, the apparatus may determine (e.g., calculate, compute, etc.) a convolution of the spatial neighborhood and a gaussian function to produce the quantification.

In some examples, the convolution may be performed at a first length scale to produce the quantification. A length scale is a distance or size. For instance, a length scale may indicate a size (e.g., diameter) of the spatial neighborhood. As described above, the spatial neighborhood may be a region around a voxel. In some examples, the length scale (e.g., size, diameter, radius, etc.) may scale the spatial neighborhood relative to a voxel. For instance, the spatial neighborhood may be scaled according to the first length scale to determine the quantification (e.g., perform a convolution).

In some examples, the method 100 may include determining respective quantifications based on respective length scales. In some examples, the method 100 may include performing a second convolution at a second length scale to produce a second quantification and may include performing a third convolution at a third length scale to produce a third quantification. In some examples, the first length scale, the second length scale, and the third length scale may be unequal (e.g., different in size). For instance, the apparatus may set the size of (e.g., may scale) the spatial neighborhood according to the first length scale and determine the quantification (e.g., perform a gaussian convolution at the first length scale). The apparatus may set the spatial neighborhood according to the second length scale to determine the second quantification and may set the spatial neighborhood to the third length scale to determine the third quantification. In some examples, the first length scale may be utilized to scale the spatial neighborhood to a one-inch diameter sphere, the second length scale may be utilized to scale the spatial to a two-inch diameter sphere, and the third length scale may be utilized to scale the spatial neighborhood to a four-inch diameter sphere. In some examples, different quantities of length scales and/or different sizes of length scales may be utilized.

The apparatus may predict 104, using a machine learning model, a manufacturing powder degradation based on the quantification and a position of the voxel. For example, the machine learning model may be trained to determine (e.g., predict, infer, etc.) manufacturing powder degradation based on a quantification and a position of a voxel. For instance, the machine learning model may be trained with a training dataset that includes training quantification data (e.g., quantifications of voxels of a build) and position data as input data and manufacturing powder degradation values (e.g., measured, calculated, and/or simulated manufactured powder degradation values) as ground truth data during training. In some examples, the apparatus and/or another device may train the machine learning model.

Once the machine learning model is trained, the apparatus may execute the machine learning model to produce the manufacturing powder degradation. For instance, the apparatus may input the quantification and a position of the voxel to the machine learning model. The machine learning model may predict the manufacturing powder degradation based on the quantification and the position of the voxel. In some examples, the position includes an $\mathbb{X}$ location, a $\mathbb{Y}$ location, and a $\mathbb{Z}$ location. For instance, the position may be expressed as three coordinate values that indicate a location (e.g., center position, index, etc.) of the voxel in a build volume.

In some examples, the machine learning model may utilize another input or inputs. In some examples, predicting the manufacturing powder degradation may be based on a build height. A build height is a value indicating a height of a build volume (e.g., height in a $\mathbb{Z}$ dimension). In some examples, the machine learning model may determine (e.g., predict, infer, etc.) the manufacturing powder degradation of a voxel based on inputs of build height, position of the voxel inside the build volume, and three convolutions of the spatial neighborhood of a voxel (e.g., a local neighborhood analysis). In some examples, using the machine learning model to predict the manufacturing powder degradation may provide rapid computation of the manufacturing powder degradation for multiple voxels. For instance, prediction may be performed on a graphics processing unit (GPU) at a rate of approximately 20 million voxels/second or on a central processing unit (CPU) at a rate of approximately 3 million voxels/second.

A manufacturing powder degradation (e.g., manufacturing powder degradation value) is a quantity or value indicating an amount of degradation (e.g., quality reduction) of manufacturing powder. Examples of a manufacturing powder degradation may include a stress and/or a quality metric (e.g., b*). In some examples, the manufacturing powder degradation may be predicted for a manufacturing powder that may be subjected to thermo-oxidative degradation. For instance, some of the techniques described herein may be utilized for manufacturing powders that exhibit yellowing with degradation and/or for manufacturing powders that degrade without exhibiting yellowing.

A stress is a value or quantity indicating an amount of powder degradation. In some examples, predicting 104 the manufacturing powder degradation may include predicting a stress based on the quantification and the position. A predicted stress is a stress that is predicted (e.g., inferred, computed, etc.) via a machine learning model. For example, the machine learning model may be a neural network that is trained to predict a stress. In some examples, the stress may indicate stress for a portion (e.g., voxel(s)) of a build and/or for a whole build (e.g., all voxels of a build). For instance, a stress to the powder at a voxel or voxels may be predicted based on the voxel location, the quantification, and/or the build height. In some examples, the term "stress" may refer to a number indicative of an amount of degradation experienced by the powder (e.g., predicted to be experienced by the powder) due to an environmental factor. In some examples, the amount of manufacturing powder degradation may depend on the interaction between multiple environmental factors, so various amounts of degradation may result from a particular amount of stress due to one environmental factor depending on the state of other environmental factors. Examples of environmental factors may include temperature, an amount of gases present at or near the voxel (or a degree to which the gases are able to diffuse from the voxel), an amount of water or other substances present at or near the voxel (e.g., due to humidity, agents delivered to the print volume, etc.), or the like. The stress may or may not be in defined units. For example, the stress may be specified in a set of custom arbitrary units. In some examples, stress may be simulated and/or calculated to produce a training dataset of stress values. The training dataset may be utilized to train the machine learning model. Once trained, the machine learning model may be utilized to predict stress.

In some examples, predicting 104 the manufacturing powder degradation may include determining a powder quality metric based on the stress. For instance, the apparatus may predict, using a second machine learning model, the manufacturing powder degradation based on the predicted stress. For instance, the predicted stress may be provided to a second machine learning model, which may predict the powder quality metric. The second machine learning mode may be trained to predict the powder quality metric based on the predicted stress. During training, for instance, the second machine learning model may take training stresses (e.g., training predicted stresses) as input and training powder quality metrics (e.g., training b* values) as ground truth. In some examples, the machine learning model and the second machine learning model may be trained separately. In some examples, the second machine learning model may predict the powder degradation based on the predicted stress and an initial stress. For instance, the predicted stress and the initial stress may be provided as inputs to the second machine learning model to predict the powder degradation (e.g., quality metric, b*, etc.).

In some examples, the manufacturing powder degradation may be quantified in terms of the powder quality metric. For example, the degree of degradation may be estimated by predicting a post-print quality metric for the powder at a voxel or voxels and/or by specifying a change in the quality metric projected to result from printing, etc. In some examples, predicting 104 the manufacturing powder degradation may be accomplished as described in relation to FIG. 6.

In some examples, the machine learning model may not predict an overall incremental thermal journey for each voxel. For instance, the manufacturing powder degradation may be directly predicted based on the input(s) (e.g., voxel location, build height, and/or quantification(s)).

Some examples of the techniques described herein may enable rapidly predicting the manufacturing powder degradation of a voxel or voxels. For instance, some examples may skip some incremental calculations (e.g., simulation). In some examples, a quantification(s) may be utilized to describe the spatial neighborhood of (e.g., an environment surrounding) a voxel and directly predict the manufacturing powder degradation for 3D printing.

Figure 2:
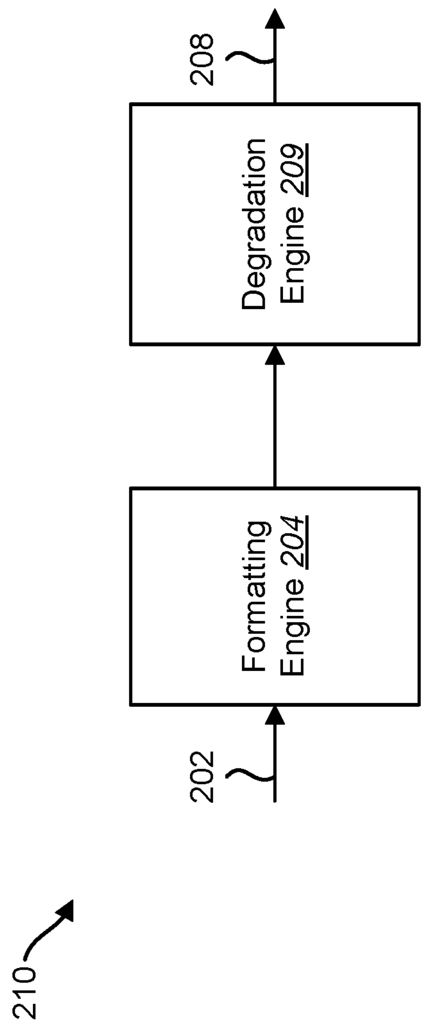
FIG. 2 is a block diagram illustrating examples of engines for manufacturing powder degradation prediction.

FIG. 2 is a block diagram illustrating examples of engines 210 for manufacturing powder degradation prediction. As used herein, the term "engine" refers to circuitry (e.g., analog or digital circuitry, a processor, such as an integrated circuit, or other circuitry, etc.) or a combination of instructions (e.g., programming such as machine- or processor-executable instructions, commands, or code such as a device driver, programming, object code, etc.) and circuitry. Some examples of circuitry may include circuitry without instructions such as an application specific integrated circuit (ASIC), a Field Programmable Gate Array (FPGA), etc. A combination of circuitry and instructions may include instructions hosted at circuitry (e.g., an instruction module that is stored at a processor-readable memory such as random-access memory (RAM), a hard-disk, or solid-state drive, resistive memory, or optical media such as a digital versatile disc (DVD), and/or executed or interpreted by a processor), or circuitry and instructions hosted at circuitry.

In some examples, the engines 210 may include a formatting engine 204 and/or a degradation engine 209. In some examples, one, some, or all of the operations described in relation to FIG. 2 may be performed by the apparatus 324 described in relation to FIG. 3. For instance, instructions for formatting and/or degradation determination may be stored in memory and executed by a processor in some examples. In some examples, an operation or operations (e.g., formatting and/or degradation determination, etc.) may be performed by another apparatus. For instance, formatting may be carried out on a separate apparatus and sent to the apparatus. In some examples, one, some, or all of the operations described in relation to FIG. 2 may be performed in the method 100 described in relation to FIG. 1.

Model data 202 may be obtained. For example, the model data 202 may be received from another device and/or generated. Model data is data indicating a model or models of an object or objects and/or a build or builds. A model is a geometrical model of an object or objects. A model may specify shape and/or size of a 3D object or objects. In some examples, a model may be expressed using polygon meshes and/or coordinate points. For example, a model may be defined using a format or formats such as a 3D manufacturing format (3MF) file format, an object (OBJ) file format, computer aided design (CAD) file, and/or a stereolithography (STL) file format, etc. In some examples, the model data 202 indicating a model or models may be received from another device and/or generated. For instance, an apparatus may receive a file or files of model data 202 and/or may generate a file or files of model data 202. In some examples, an apparatus may generate model data 202 with model(s) created on the apparatus from an input or inputs (e.g., scanned object input, user-specified input, etc.).

The formatting engine 204 may voxelize the model data 202 by dividing the model data 202 into a plurality of voxels. In some examples, the build volume may be a rectangular prism, and the voxels may be rectangular prisms. For example, the formatting engine 204 may slice the build volume with planes parallel to the $\mathbb{xy}$ plane, the $\mathbb{yz}$ plane, and the $\mathbb{xz}$ plane to form the voxels. In some examples, a 3D printer may have a printing resolution, such as a resolution in the $\mathbb{xy}$ plane and a resolution along the $\mathbb{z}$ axis. The formatting engine 204 may voxelize (e.g., slice) the model data 202 into voxels with sizes equal to the resolution of the 3D printer, into larger voxels (e.g., extended voxels), and/or into smaller voxels. Some examples of voxel sizes may include 0.2 mm, 0.25 mm, 0.5 mm, 1 mm, 2 mm, 4 mm, 5 mm, 32 mm, 64 mm, etc. The voxels and corresponding voxel locations produced by the formatting engine 204 may be provided to the degradation engine 209.

The degradation engine 209 may predict manufacturing powder degradation 208 (e.g., stress, quality metric, and/or b*) based on the voxels and the corresponding voxel locations. In some examples, the degradation engine 209 may determine a quantification of a spatial neighborhood of a voxel of a build volume as described in relation to FIG. 1. For instance, the degradation engine 209 may perform a convolution (e.g., gaussian convolution) of the spatial neighborhood of the voxel to determine the quantification. In some examples, the degradation engine 209 may determine multiple quantifications (e.g., the quantification, a second quantification, a third quantification, etc.) at different length scales (e.g., a first length scale, a second length scale, and a third length scale, etc.).

In some examples, the degradation engine 209 may predict, using a machine learning model, a manufacturing powder degradation 208 as described in relation to FIG. 1. For instance, the degradation engine 209 may utilize a machine learning model(s) (e.g., regression prediction model(s)) to predict a voxel stress(es) based on the quantification(s), a position(s) of the voxel(s), and/or a build height. In some examples, the degradation engine 209 may utilize the machine learning model to predict a predicted stress, and may utilize a second machine learning model to predict a powder quality metric (e.g., b*) based on the predicted stress.

Figure 3:
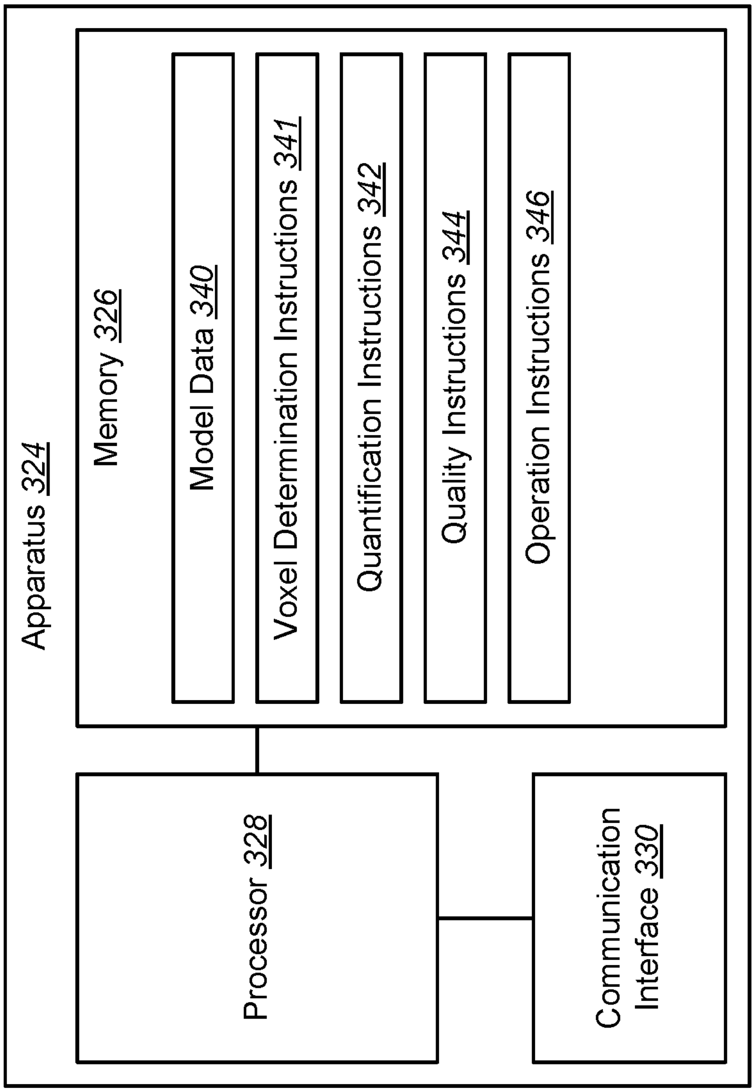
FIG. 3 is a block diagram of an example of an apparatus that may be used in manufacturing powder prediction.

FIG. 3 is a block diagram of an example of an apparatus 324 that may be used in manufacturing powder prediction. The apparatus 324 may be a computing device, such as a personal computer, a server computer, a printer, a 3D printer, a smartphone, a tablet computer, etc. The apparatus 324 may include and/or may be coupled to a processor 328, a communication interface 330, and/or a memory 326. In some examples, the apparatus 324 may be in communication with (e.g., coupled to, have a communication link with) an additive manufacturing device (e.g., a 3D printer). In some examples, the apparatus 324 may be an example of 3D printer. The apparatus 324 may include additional components (not shown) and/or some of the components described herein may be removed and/or modified without departing from the scope of the disclosure.

The processor 328 may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory 326. The processor 328 may fetch, decode, and/or execute instructions stored on the memory 326. In some examples, the processor 328 may include an electronic circuit or circuits that include electronic components for performing a functionality or functionalities of the instructions. In some examples, the processor 328 may perform one, some, or all of the aspects, elements, techniques, etc., described in relation to one, some, or all of FIGS. 1-6.

The memory 326 is an electronic, magnetic, optical, and/or other physical storage device that contains or stores electronic information (e.g., instructions and/or data). The memory 326 may be, for example, Random Access Memory (RAM), Electrically Erasable Programmable Read-Only Memory (EEPROM), a storage device, an optical disc, and/or the like. In some examples, the memory 326 may be volatile and/or non-volatile memory, such as Dynamic Random-Access Memory (DRAM), EEPROM, magnetoresistive random-access memory (MRAM), phase change RAM (PCRAM), memristor, flash memory, and/or the like. In some examples, the memory 326 may be a non-transitory tangible machine-readable storage medium, where the term “non-transitory” does not encompass transitory propagating signals. In some examples, the memory 326 may include multiple devices (e.g., a RAM card and a solid-state drive (SSD)).

In some examples, the apparatus 324 may include a communication interface 330 through which the processor 328 may communicate with an external device or devices (not shown), for instance, to receive and store the information pertaining to an object or objects. The communication interface 330 may include hardware and/or machine-readable instructions to enable the processor 328 to communicate with the external device or devices. The communication interface 330 may enable a wired or wireless connection to the external device or devices. In some examples, the communication interface 330 may include a network interface card and/or may also include hardware and/or machine-readable instructions to enable the processor 328 to communicate with various input and/or output devices, such as a keyboard, a mouse, a display, another apparatus, electronic device, computing device, printer, etc. In some examples, a user may input instructions into the apparatus 324 via an input device.

In some examples, the memory 326 may store model data 340. The model data 340 may include and/or indicate a model or models (e.g., 3D object model(s), 3D manufacturing build(s), etc.). For instance, the model data 340 may include and/or indicate a build of manufacturing powder in three dimensions. The apparatus 324 may generate the model data 340 and/or may receive the model data 340 from another device.

The memory 326 may store voxel determination instructions 341. For example, the voxel determination instructions 341 may be instructions for determining a voxel or voxels representing a build of manufacturing powder. In some examples, the processor 328 may execute the voxel determination instructions 341 to determine a voxel representing a portion of a build of manufacturing powder. In some examples, the voxel determination instructions 341 may include slicing and/or voxelization instructions to voxelize the 3D model data to produce voxels of a build. In some examples, the processor 328 may determine the voxels as described in relation to FIG. 1 and/or FIG. 2.

In some examples, the memory 326 may store quantification instructions 342. The processor 328 may execute the quantification instructions 342 to perform a convolution based on neighboring voxels of the voxel to produce a quantification. In some examples, performing a convolution based on neighboring voxels to produce a quantification may be performed as described in relation to FIG. 1 and/or FIG. 2. For instance, the convolution may be performed at a first length scale. In some examples, the processor 328 may perform a second convolution at a second length scale that is different from the first length scale to produce a second quantification.

In some examples, the memory 326 may store quality instructions 344. The processor 328 may execute the quality instructions 344 to determine a powder quality metric based on the quantification. In some examples, determining the powder quality metric may be performed as described in relation to FIG. 1, FIG. 2, FIG. 4, and/or FIG. 6. In some examples, the processor 328 may determine the powder quality metric based on the quantification and the second quantification. For instance, the processor 328 may predict, using a first machine learning model, a predicted stress based on the quantification(s). In some examples, the processor 328 may predict, using a second machine learning model, the powder quality metric as a b* component of a color space based on the predicted stress.

In some examples, the memory 326 may store operation instructions 346. In some examples, the processor 328 may execute the operation instructions 346 to perform an operation based on the quality metric. In some examples, the processor 328 may execute the operation instructions 346 to determine a quantity of fresh powder to achieve a target quality level. For instance, the quality metric may be utilized to determine an aggregate quality of powder to be reclaimed from the build. The processor 328 may calculate an amount of fresh powder to add to the reclaimed powder to achieve the target quality level (e.g., average b*=4).

In some examples, the processor 328 may execute the operation instructions 346 to instruct a printer to print the 3D manufacturing build. For instance, the apparatus 324 may utilize the communication interface 330 to send the build to a printer for printing.

In some examples, the operation instructions 346 may include 3D printing instructions. For instance, the processor 328 may execute the 3D printing instructions to print a 3D object or objects. In some examples, the 3D printing instructions may include instructions for controlling a device or devices (e.g., rollers, print heads, thermal projectors, and/or fuse lamps, etc.). For example, the 3D printing instructions may use a build to control a print head or heads to print an agent or agents in a location or locations specified by the build. In some examples, the processor 328 may execute the 3D printing instructions to print a layer or layers. In some examples, the processor 328 may execute the operation instructions 346 to present a visualization or visualizations of the build and/or the quality metric on a display and/or send the visualization or visualizations of the build and/or the quality metric to another device (e.g., computing device, monitor, etc.).

Figure 4:
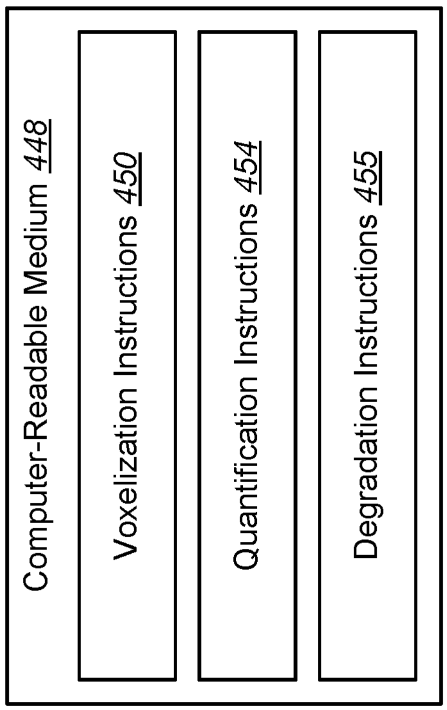
FIG. 4 is a block diagram illustrating an example of a computer-readable medium for manufacturing powder degradation prediction.

FIG. 4 is a block diagram illustrating an example of a computer-readable medium 448 for manufacturing powder degradation prediction. The computer-readable medium 448 is a non-transitory, tangible computer-readable medium. The computer-readable medium 448 may be, for example, RAM, EEPROM, a storage device, an optical disc, or the like. In some examples, the computer-readable medium 448 may be volatile and/or non-volatile memory, such as DRAM, EEPROM, MRAM, PCRAM, memristor, flash memory, and/or the like. In some examples, the memory 326 described in relation to FIG. 3 may be an example of the computer-readable medium 448 described in relation to FIG. 4. In some examples, the computer-readable medium 448 may include code, instructions, and/or data to cause a processor to perform one, some, or all of the operations, aspects, elements, etc., described in relation to one, some, or all of FIG. 1, FIG. 2, FIG. 3, FIG. 4, FIG. 5, and/or FIG. 6.

The computer-readable medium 448 may include data (e.g., information, instructions, and/or executable code). For example, the computer-readable medium 448 may include voxelization instructions 450, quantification instructions 454, and/or degradation instructions 455.

The voxelization instructions 450 may be instructions when executed cause a processor of an electronic device to voxelize a manufacturing build to produce voxels. In some examples, voxelizing a manufacturing build to produce voxels may be performed as described in relation to FIG. 1, FIG. 2, and/or FIG. 3.

The quantification instructions 454 may include instructions when executed cause the processor of the electronic device to determine, for a first voxel of the voxels, a quantification based on a length scale. In some examples, determining the quantification for the first voxel based on a length scale may be performed as described in relation to FIG. 1, FIG. 2, and/or FIG. 3. In some examples, the quantification instructions 454 may include instructions when executed cause the processor of the electronic device to perform a gaussian convolution at the length scale to determine the quantification for the first voxel. In some examples, the length scale indicates a spherical neighborhood of the voxels around the first voxel.

The degradation instructions 455 may include instructions when executed cause the processor of the electronic device to predict, using a machine learning model, manufacturing powder degradation based on the quantification, a position, and a build height. In some examples, predicting the manufacturing powder degradation may be performed as described in relation to FIG. 1, FIG. 2, and/or FIG. 3. In some examples, the manufacturing powder degradation may be a voxel stress of the first voxel. For instance, the manufacturing powder degradation may be expressed as a voxel stress and/or as a quantity (e.g., quality metric, *b, etc.) based on the voxel stress.

Figure 5:
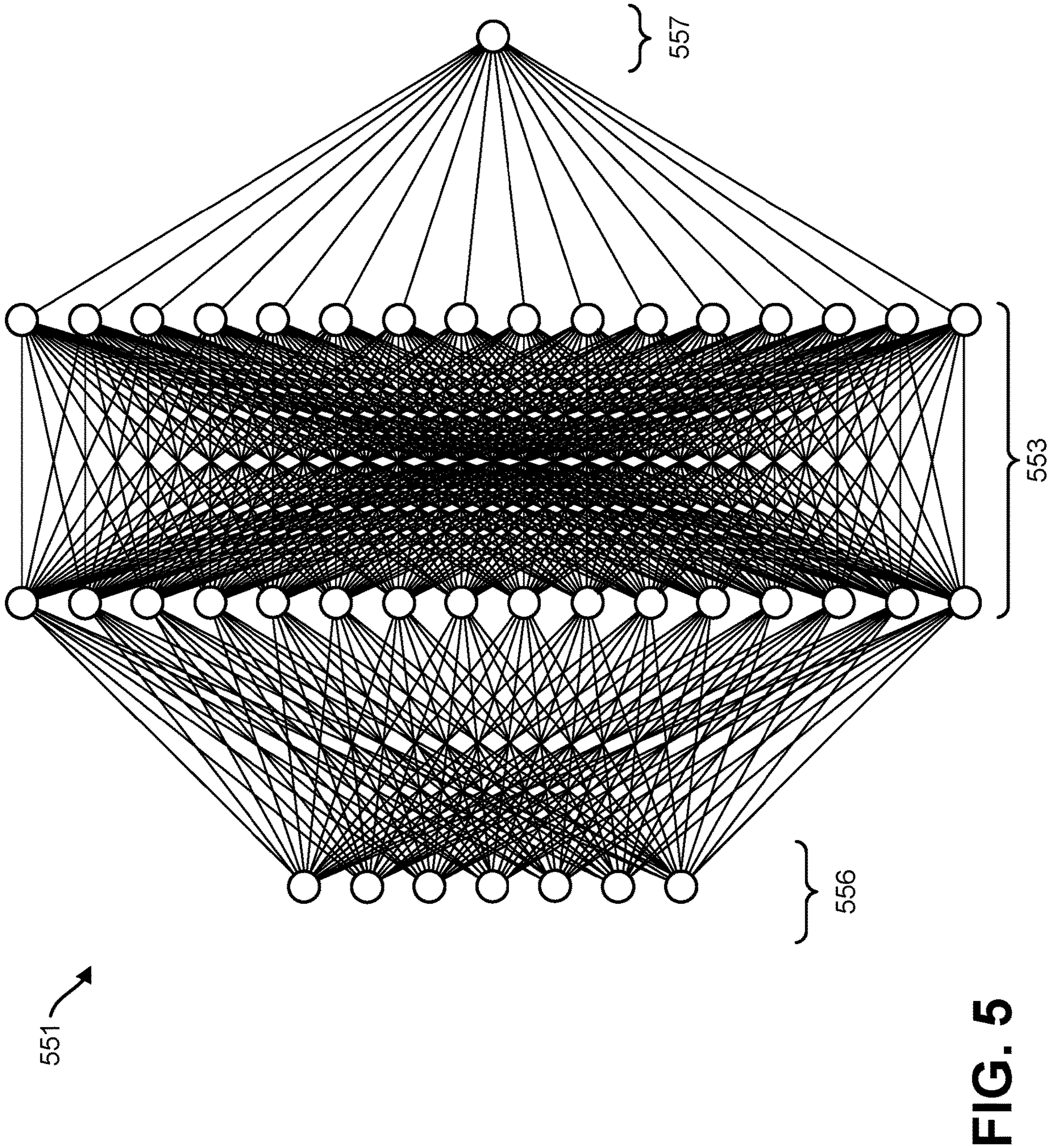
FIG. 5 is a diagram illustrating an example of a machine learning model architecture in accordance with some of the examples described herein.

FIG. 5 is a diagram illustrating an example of a machine learning model architecture 551 in accordance with some of the examples described herein. In this example, the architecture 551 includes an input layer 556, hidden layers 553, and an output layer 557. In some examples, the input layer 556 may take seven inputs. For instance, four of the inputs may include an $\mathbb{x}$ position, a $\mathbb{y}$ position, and a $\mathbb{z}$ position of the voxel inside a build volume, and a build height of the build volume. These four inputs may provide the architecture 551 data (e.g., a view) indicating characteristics of a voxel cooldown profile (e.g., how tall the build is and vowelizing how close the voxel is to the nearest wall(s)). Three of the inputs may be calculated from three gaussian convolutions performed on part voxel data at various length scales. In some examples, the gaussian convolutions may provide a quantification (e.g., an analysis of roughly 1", 2", and 4" diameter spheres surrounding a voxel). These three inputs may provide the architecture 551 with data (e.g., a view) of the thermal mass of an object(s) (if any) surrounding the voxel. From this combined data, with hidden layers 553 (e.g., 2 hidden layers 553 of 16 nodes), the output layer 557 may produce the output value of a delta stress in some examples. In some examples, utilizing the architecture 551 may reduce a computational load and/or may enhance computational efficiency when calculating a manufacturing powder degradation.

Figure 6:
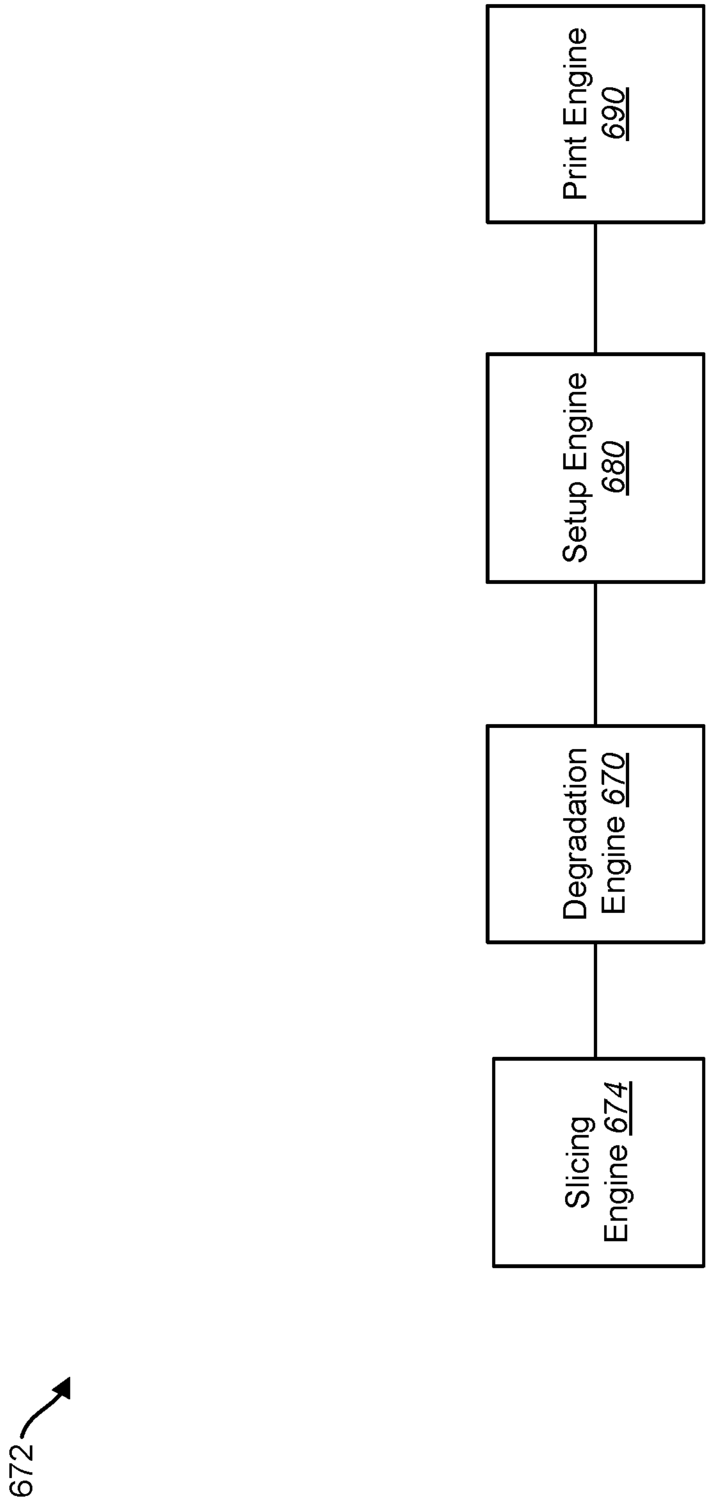
FIG. 6 is a block diagram illustrating an example of engines to predict an amount of powder degradation for a 3D print.

FIG. 6 is a block diagram illustrating an example of engines 672 to predict an amount of powder degradation for a 3D print. The engines 672 may include a slicing engine 674. The slicing engine 674 may slice a build file to determine a plurality of voxels. The build file may include data that describes a plurality of objects to be printed within a build volume, including the pose of the objects within the build volume. The slicing engine 674 may slice the build file by dividing the build volume into a plurality of voxels. In some examples, the build volume may be a rectangular prism, and the voxels may be rectangular prisms. For example, the slicing engine 674 may slice the build volume with planes parallel to the $\mathbb{xy}$ plane, the $\mathbb{yz}$ plane, and $\mathbb{xz}$ plane to form the voxels. The 3D printer may have a printing resolution, such as a resolution in the $\mathbb{xy}$ plane and a resolution along the $\mathbb{z}$ axis. The slicing engine 674 may slice the build file into voxels with sizes equal to the resolution of the 3D printer, into larger voxels, and/or into smaller voxels. The voxels may be provided to a degradation engine 670.

In some examples, the degradation engine 670 may include a stress engine. The stress engine may calculate a stress (e.g., a calculated stress) to the powder at each voxel. For instance, the stress engine may execute and/or utilize a machine learning model to produce a stress for the powder of each voxel as described herein. In some examples, the machine learning model may be trained with training data produced in accordance with Equation (1).

Equation (1) may indicate a calculation of voxel stress from time and/or temperature profiles, which may be determined by measuring and/or simulating thermal behavior. For example, the incremental change in powder stress (e.g., degradation) as a result of some amount of time at some temperature may be approximated using a version of the Arrhenius equation, shown in Equation (1). In Equation (1), R represents the universal gas constant, and Ea and a0 are physical constants of the material in question, which may be obtained experimentally. The variables Tm and tm represent the temperature of the voxel in Kelvin and duration in hours of a time increment being evaluated. By calculating the sum of the stresses for each time increment in a thermal profile, a single value can be obtained for the change in powder stress state for each voxel in a build volume. The change in powder stress may be utilized as a ground truth to train the machine learning model. Once the machine learning model is trained, the machine learning model may be utilized to predict the voxel stress change without calculating Equation (1).

$$\sigma_{Thermal} = \sum_{m} t_m e^{\left(a_0 - \frac{E_a}{RT_m}\right)} \tag{1}$$

In Equation (1), $\sigma_{Thermal}$ is the calculated stress at a voxel, the sum is over all time increments m, $t_m$ is the duration of a time increment m, a0 is a constant specific to the material, $E_a$ is the activation energy and is specific to the material and environment, R is the gas constant, and $T_m$ is the temperature of the voxel at time increment m. In some examples, some time increments may have different lengths.

The degradation engine 670 (e.g., stress engine) may determine an amount of degradation of the manufacturing powder at the voxel based on inputs including an $\mathbb{Z}$ location, a $\mathbb{Y}$ location, a $\mathbb{Z}$ location, a build height, and/or a quantification. For example, the degradation engine 670 (e.g., stress engine) may compute the quantification based on the $\mathbb{Z}$ location, $\mathbb{Y}$ location, and $\mathbb{Z}$ location of a voxel by convolving a spatial neighborhood of the voxel as described herein. The degradation engine 670 (e.g., stress engine) may predict the voxel stress based on the $\mathbb{Z}$ location, the $\mathbb{Y}$ location, the $\mathbb{Z}$ location, a build height, and the quantification as described herein.

The degradation engine 670 may compute, for each voxel, a quality metric or change in quality metric that will result from the particular print job. In an example using PA 12, the degradation engine 670 may compute a b* value that will result from the print job or a change in b* value that will result from the print job. In some examples, the degradation engine 670 may compute a value indicative of the amount of degradation and convert the computed value into the quality metric domain (e.g., the b* domain). In examples, the degradation engine 670 may compute the quality metric directly without first computing a value in an intermediate domain.

The degradation engine 670 may include a second machine learning model to compute the quality metric based on the voxel stress. The second machine learning model may include a support vector regression(s), a neural network(s), or the like. For each voxel, the machine learning model may receive the stress and an initial value (e.g., initial stress) and output the quality metric or change in quality metric for that voxel to result from the print job. The second machine learning model may be trained based on data from actual print jobs. For example, the inputs for the second machine learning model during training may be computed based on the build file for the actual print job. The ground truth for the output from the second machine learning model may be determined by measuring the quality metric (e.g., the b* value) for the powder at a particular voxel (e.g., a sample of powder from the particular voxel). The machine learning model can be trained using values in the quality metric domain as ground truth, or the ground truth quality metric values can be converted to ground truth intermediate values used to train the machine learning model(s). In some examples, the quality metric(s) produced by the degradation engine 670 may be an output of the degradation engine 209 described in relation to FIG. 2. In some examples, the degradation engine 670 described in FIG. 6 may be an example of the degradation engine 209 described in FIG. 2. In some examples, the degradation engine 670 may include a first machine learning model (to determine voxel stress, for instance) and a second machine learning model (to determine a quality metric, for instance).

The engines 672 may include a setup engine 680. The setup engine 680 may select a setup of the three-dimensional print based on the amount of degradation. For example, the setup engine 680 may select a ratio of fresh powder to recycled powder to use during the three-dimensional print. The setup engine 680 may include previously specified rules or may receive user specified rules about the quality metric. The rules may specify that the quality metric for a worst-case voxel, average voxel, median voxel, or the like remain below a particular threshold. The setup engine 680 may determine based on a quality metric for the recycled powder how much fresh powder to add to meet the specifications of the rules. The quality metric for the recycled powder may have been measured or computed by the degradation engine 670 for a previous print job. In a PA 12 example, the setup engine 680 may compute the b* value that results from combining recycled and fresh powder by computing a weighted root mean square of the b* values for each powder added, weighted by the amount of that powder added. The setup engine 680 may compute an initial quality metric value that will result in the print job satisfying the rules and determine the amount of fresh powder to add to achieve that initial quality metric value. In some examples, the setup engine 680 may select the setup of the three-dimensional print by modifying settings of the three-dimensional printer, modifying the print job, or the like.

The engines 672 may include a print engine 690. The print engine 690 may instruct a 3D printer to print the print job with the selected setup. For example, the print engine 690 may transmit a build file, indications of printer settings, indications of the amount of fresh or recycled powder to use, or the like to the 3D printer and may indicate to the 3D printer to print using the transmitted information. The 3D printer may operate according to the transmitted information to form a build volume corresponding to the build file according to the specified settings with powder from the specified sources.

Some of the techniques described herein may determine where the highly degraded powder voxels will be for a given build. The location of the highly degraded powder voxels may be used with target powder quality and used powder production to automatically determine which powder voxels to exclude in order to achieve the target powder quality. This may enable producing build arrangements and/or matched refresh ratios that maintain a given quality level and are net consumers of used powder, that are used powder neutral (e.g., producing as much used powder as is consumed), or that are net producers of used powder. This may provide enhanced control over the quality of recycled powder and cost to maintain that quality.

Some examples of the techniques described herein may enable identification of and/or targeted removal of degraded powder voxels. For instance, some examples of the techniques may provide accurate determination of reclaimable powder voxels, including calibration for an amount of powder reclaimed from the surface of objects. Some examples of the techniques described herein may enable planning for costs of a build before printing (e.g., determining mass of objects, mass of powder trapped in printed objects, mass of powder lost on surface of objects, and/or an amount of fresh powder to replenish a trolley following a build).

Some examples of the techniques described herein may include a closed loop approach for removing degraded powder voxels from a build. For instance, some examples may include techniques to simulate voxel level powder degradation for a build and estimate the mass and quality of recyclable powder with certain voxels excluded. Some examples may include techniques to target powder voxels for exclusion from reclamation based on target powder quality and allowable waste. Some examples may include techniques to accurately assess which powder voxels are reclaimable.

As used herein, the term "and/or" may mean an item or items. For example, the phrase "A, B, and/or C" may mean any of: A (without B and C), B (without A and C), C (without A and B), A and B (without C), B and C (without A), A and C (without B), or all of A, B, and C.

While various examples are described herein, the disclosure is not limited to the examples. Variations of the examples described herein may be implemented within the scope of the disclosure. For example, aspects or elements of the examples described herein may be omitted or combined.

The invention claimed is:

1. A method comprising:

determining, by a processor, a quantification of a spatial neighborhood of a voxel of a build volume including one or more objects;

predicting, by the processor and using a machine learning model, a manufacturing powder degradation based on the quantification and a position of the voxel; and additively manufacturing the one or more objects in the build volume taking into account the predicted manufacturing powder degradation.

2. The method of claim 1, wherein the determining of the quantification comprises performing a convolution of the spatial neighborhood of the voxel.

3. The method of claim 2, wherein the convolution is a gaussian convolution.

4. The method of claim 2, wherein the convolution is performed at a first length scale to produce the quantification.

5. The method of claim 4, further comprising:

performing, by the processor, a second convolution at a second length scale to produce a second quantification; and performing, by the processor, a third convolution at a third length scale to produce a third quantification, where the first length scale, the second length scale, and the third length scale are unequal.

6. The method of claim 5, wherein the predicting of the manufacturing powder degradation is further based on the second quantification and the third quantification.

7. The method of claim 1, wherein the position of the voxel comprises an x location, a y location, and a z location, and wherein the predicting of the manufacturing powder degradation is further based on a build height.

8. The method of claim 1, wherein the predicting of the manufacturing powder degradation comprises predicting a stress based on the quantification and the position.

9. The method of claim 8, wherein the predicting of the manufacturing powder degradation comprises determining a powder quality metric based on the stress.

10. The method of claim 1, wherein additively manufacturing the one or more objects in the build volume taking into account the predicted manufacturing powder degradation comprises compensating for the predicted manufacturing powder degradation during additive manufacture of the one or more objects in the build volume.

11. The method of claim 10, wherein compensating for the predicted manufacturing powder degradation during the additive manufacture of the one or more objects in the build volume comprises adjusting a quantity of fresh manufacturing powder added to reclaimed powder to achieve a target quality level of the one or more objects when additively manufactured.

12. An apparatus comprising:

a processor; and a memory storing instructions executable by the processor to:

determine a voxel representing a portion of a build of manufacturing powder including one or more objects;

performing a convolution based on neighboring voxels of the voxel to produce a quantification;

determine a powder quality metric based on the quantification; and cause additive manufacture of the one or more objects in the build based on the determined powder quality metric.

13. The apparatus of claim 12, wherein the convolution is performed at a first length scale, and wherein the processor is to perform a second convolution at a second length scale that is different from the first length scale to produce a second quantification.

14. The apparatus of claim 13, wherein the processor is to determine the powder quality metric based on the quantification and the second quantification.

15. The apparatus of claim 12, wherein the instructions are executable by the processor to cause the additive manufacture of the one or more objects in the build based on the determined powder quality metric such by adjusting a quantity of fresh manufacturing powder added to reclaimed powder during the additive manufacture of the one or more objects.

16. A non-transitory tangible computer-readable medium storing instructions that when executed cause a processor of an electronic device to:

voxelize a manufacturing build including one or more objects to produce voxels;

determine a quantification of a spatial neighborhood for a first voxel of the voxels;

predict, using a machine learning model, manufacturing powder degradation based on the quantification, a position of the first voxel, and a build height; and cause additive manufacture of the one or more objects in the manufacturing build based on the predicted manufacturing powder degradation.

17. The non-transitory tangible computer-readable medium of claim 16, wherein the instructions when executed cause the processor of the electronic device to perform a gaussian convolution at a length scale to determine the quantification for the first voxel, wherein the length scale indicates a spherical neighborhood of the voxels around the first voxel.

18. The non-transitory tangible computer-readable medium of claim 16, wherein the predicted manufacturing powder degradation is a voxel stress of the first voxel.

19. The non-transitory tangible computer-readable medium of claim 16, wherein the additive manufacture of the one or more objects in the manufacturing build is based on the predicted manufacturing powder degradation in that the predicted manufacturing powder degradation is compensated for during the additive manufacture of the one or more objects.

20. The non-transitory tangible computer-readable medium of claim 16, wherein the additive manufacture of the one or more objects in the manufacturing build is based on the predicted manufacturing powder degradation in that a quantity of fresh manufacturing powder added to reclaimed powder during the additive manufacture of the one or more objects is adjusted.

* * * * *